United States Patent [19]

Thompson

[11] Patent Number: 4,758,368
[45] Date of Patent: Jul. 19, 1988

[54] METHOD FOR ETCHING SILICON WAFERS USING A POTASSIUM HYDROXIDE AND WATER ETCHING SOLUTION

[75] Inventor: Patrick Thompson, Chandler, Ariz.

[73] Assignee: Motorola Inc., Schaumburg, Ill.

[21] Appl. No.: 110,626

[22] Filed: Oct. 19, 1987

Related U.S. Application Data

[63] Continuation of Ser. No. 887,765, Jul. 21, 1986, abandoned.

[51] Int. Cl.$^4$ .............................................. C09K 13/02
[52] U.S. Cl. ................................ 252/79.5; 156/662; 156/647; 156/657
[58] Field of Search .................. 156/662, 647, 657; 252/79.5

[56] References Cited

U.S. PATENT DOCUMENTS

| | | | |
|---|---|---|---|
| 4,251,383 | 2/1981 | Kemp | 252/118 |
| 4,314,022 | 2/1982 | Fisch | 252/79.5 |
| 4,348,254 | 9/1982 | Lindmayer | 252/79.5 |
| 4,426,253 | 1/1984 | Kreuz et al. | 252/79.5 |
| 4,601,779 | 7/1986 | Abernathy et al. | 252/79.5 |
| 4,639,290 | 1/1987 | Leyden | 252/79.5 |

OTHER PUBLICATIONS

Ace Scientific Catalog, East Brunswick, N.J., 1983, 1984 ed.

*Primary Examiner*—David L. Lacey
*Assistant Examiner*—Lori-Ann Johnson
*Attorney, Agent, or Firm*—Harry A. Wolin

[57] ABSTRACT

A method for etching silicon wafers having a (100) or (110) crystallographic orientation. The method includes using an etching solution consisting essentially of potassium hydroxide (KOH) and water. This allows for an optimum combination of etch rate and etch quality.

6 Claims, 2 Drawing Sheets

METHOD FOR ETCHING SILICON WAFERS USING A POTASSIUM HYDROXIDE AND WATER ETCHING SOLUTION

This application is a continuation of application Ser. No. 887,765, filed on 7-21-86, now abandoned.

BACKGROUND OF THE INVENTION

This invention generally pertains to a method for etching silicon wafers with an etching solution consisting essentially of potassium hydroxide (KOH) and water ($H_2O$). Generally in (100) silicon etching using KOH, an anisotropic etching solution consisting of KOH, $H_2O$ and an alcohol additive, usually isopropyl alcohol (IPA), is used. The particular etching solution etches only the (100) plane at an appreciable rate when applied to the (100) oriented plane. Because the (110) and (111) planes are not significantly affected in this process, the resulting etched cavity is V-shaped.

Generally, the etching process takes place in a temperature controlled pyrex container. When this pyrex is exposed to the KOH, certain complex silicates can be leached from the container. To counteract the possible contamination by these complex silicates, an alcohol additive is used. The alcohol additive, however, decreases the obtainable etch rate. Previous experimentation with a KOH and $H_2O$ etching solution has been performed using a pyrex container. However, the inferior results obtained do not indicate that a KOH and $H_2O$ only etching solution in a non-leachable container is a superior etching solution to one of KOH, $H_2O$ and IPA. In an etching solution, the properties of high rate and quality are desired. Therefore, an optimum etching solution is one which will give a desired combination of etch rate and etch quality.

SUMMARY OF THE INVENTION

The present invention pertains to a method for etching silicon wafers using an etching solution consisting essentially of KOH and $H_2O$. In the present invention, the etching process occurs in a vessel of a material not leachable by KOH such as stainless steel. Because the etching process occurs in the non-leachable stainless steel vessel, an alcohol additive such as isopropyl alcohol is not required to counteract leaching. In addition, isopropyl alcohol results in a decreased etch rate. Therefore, a two component etching solution may be used. The two component etching solution of KOH and $H_2O$ results in an etch rate superior to that of KOH, $H_2O$ and isopropyl alcohol. In addition, a high quality etch with minimal pits, hillocks and faceting of (111) surfaces is obtained.

It is an object of the present invention to provide a new and improved method for etching silicon wafers.

It is a further object of the present invention to provide a method for etching silicon wafers which does not take place in a pyrex vessel.

It is a further object of the present invention to provide a two component etching solution consisting of KOH and $H_2O$.

It is a further object of the present invention to provide a method for etching silicon wafers wherein high speed and good quality etches are obtained.

These and other objects will become apparent to those skilled in the art upon consideration of the following specification, claims and drawings.

BRIEF DESCRIPTION OF THE DRAWINGS

FIG. 3 is a graphic representation of the etch rate and etch quality versus the composition of the etching solution.

DESCRIPTION OF THE PREFERRED EMBODIMENT

The process of etching silicon wafers in the manufacturing of micro-electronic devices has been used for many years. To begin this process, a silicon wafer having a surface must be provided. Next, an etch resistant layer must be formed on said surface and said etch resistant layer must be patterned. These steps are wellknown in the art. The next step to be performed is applying an etching solution to the silicon wafer. An ideal etching solution will be one that provides a quality etch with minimal pits, hillocks, and faceting and etches at an optimum etch rate. Generally, KOH etching solutions consist of KOH, $H_2O$, and isopropyl alcohol. The present invention uses only KOH and $H_2O$.

Figure 1:
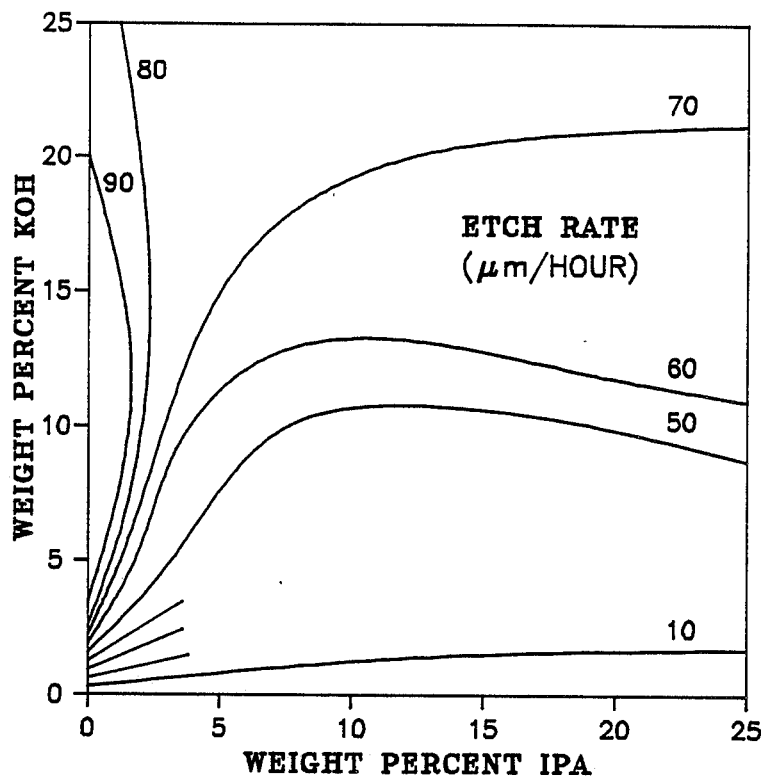
FIG. 1 is a graphical representation of the etch rate versus the composition of the etching solution.

Referring specifically to FIG. 1, a graphical representation of etch rate in micrometers/hour versus composition of the etching solution is shown. This rate is for the etching of silicon having a (100) crystallographic orientation. However, the etching solution may also be used in the etching of (110) silicon. The composition of the etching solution is measured as a percentage by weight in the solution. The ordinate shows the percentage by weight of KOH while the abscissa shows a percentage by weight of isopropyl alcohol. The remaining component of the solution is water. The graph shows that generally the etch rate increases as the amount of isopropyl alcohol in the solution is decreased. The temperature of the etching solution has been kept constant at 80° C.

Figure 2:
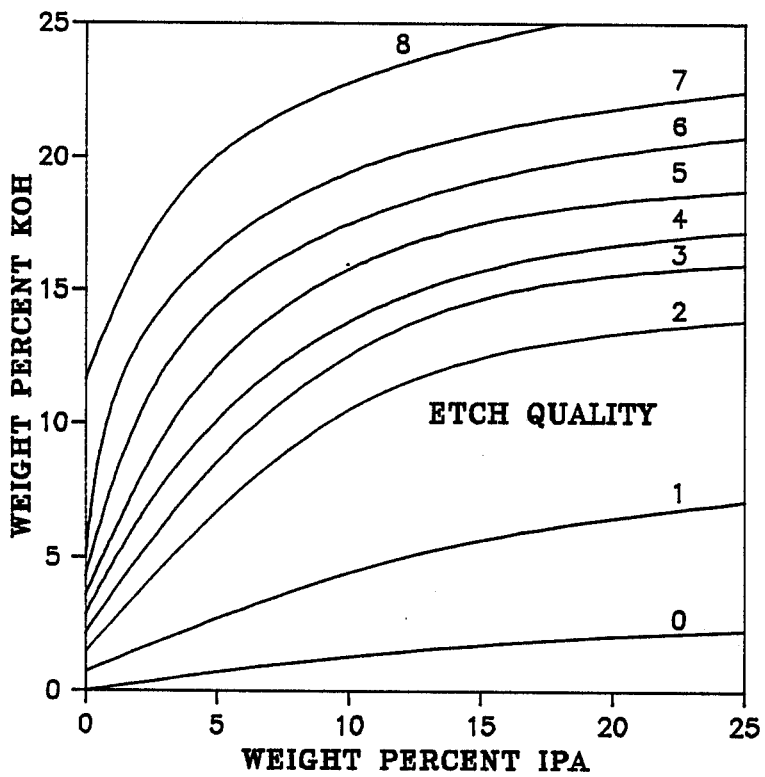

FIG. 2 illustrates a graphical representation of etch quality versus composition of the etching solution is shown. The quality refers to the surface characteristics of the etched surface including pits, hillocks, and faceting of (111) silicon surfaces. The etch quality is visually determined. The contour lines indicate compositions yielding equal etch quality values. Etch quality is rated on a scale of 0-10, with 10 being the highest possible quality. The graph shows that etch quality increases as the amount of KOH in the solution increases.

Figure 3:
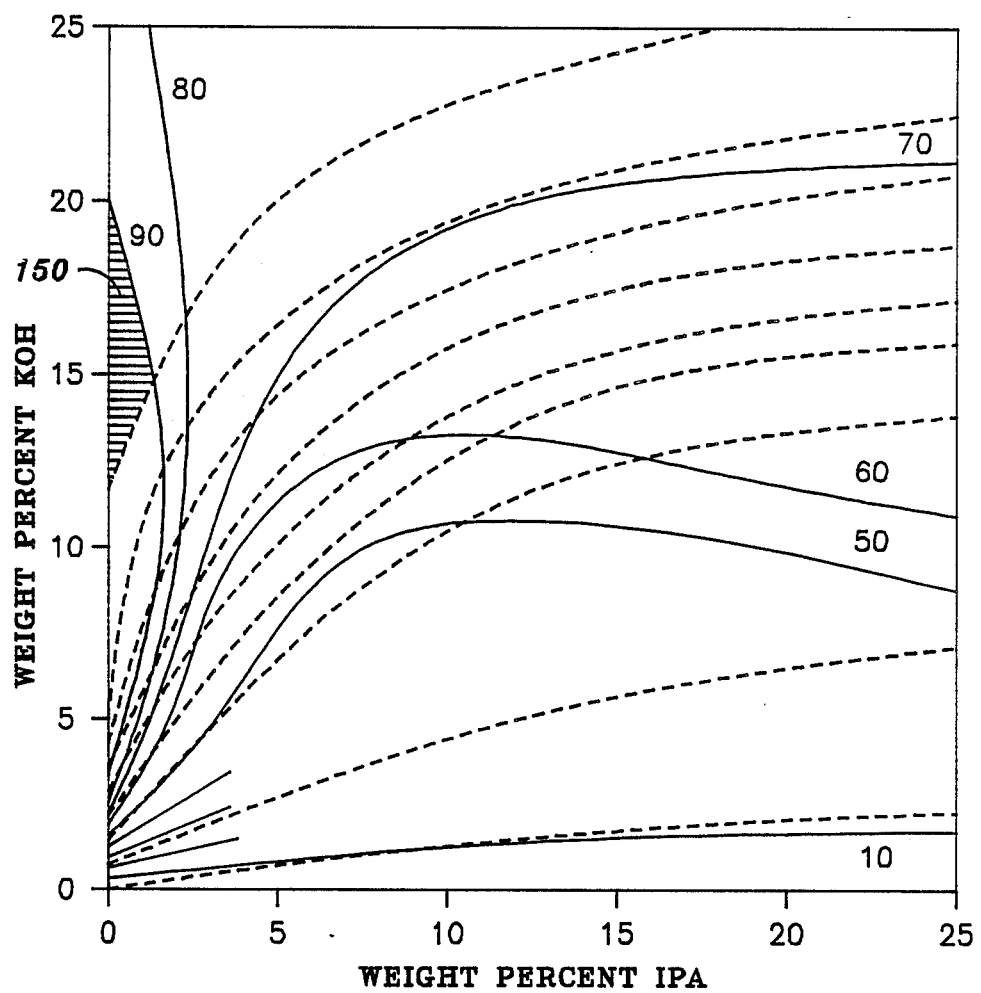
FIG. 3 is a graphical representation of the etch quality versus the composition of the etching solution.

Referring specifically to FIG. 3, a graphical representation of etch rate and etch quality versus composition of the etching solution is shown. Essentially, FIG. 1 and FIG. 2 are combined so that their relation to each other can be observed. Shaded area 150 shows the optimum obtained combination of etch rate and etch quality. Since the zero weight percentage of isopropyl alcohol is included in shaded area 150 a KOH and $H_2O$ only solution should be used for simplicity. Further experimentation at 80° C. has led to the determination that the optimum solution at this temperature will consist of 16% by weight KOH and 84% by weight $H_2O$. However, it has been experimentally determined that a KOH and $H_2O$ only etching solution is viable wherein it contains 50%-99.9% $H_2O$. In addition, the etching can occur at a temperature between 55° C. and the boiling point of the solution.

Because there is the possibility of leaching of complex silicates by KOH occurring in a pyrex container, pyrex must not be used with an etching solution consisting of KOH and H$_2$O only. In addition, containers made of other materials which can be leached by KOH should not be used. In the preferred embodiment, a temperature controlled stainless steel vessel is used to contain the etching solution. The stainless steel vessel used is jacketed and includes means for injecting heated oil into the jacketed area to keep the temperature constant at 80° C. After the silicon wafer has been in the etching solution a predetermined period of time determined by the known etch rate and the depth of the desired etch, it is removed from the etching solution and rinsed so that no more etching will occur.

Thus it is apparent that there has been provided, in accordance with the invention, an improved method for etching silicon wafers which meets objects and advantages set forth above. This two component etching solution is simpler and more economical than standard three component solutions and provides a quality etch at an appreciably faster rate. While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A method of etching silicon wafers comprising the steps of:
   providing a silicon wafer having a surface;
   forming an etch resistant layer on said surface;
   patterning said etch resistant layer;
   positioning said wafer into an etching solution of KOH and H$_2$O, said etching solution composition being defined by the shaded area 150 of FIG. 3;
   removing said wafer from said etching solution after said wafer has been etched a predetermined amount.
   rinsing said etching solution from said wafer.

2. The method of claim 1 wherein said solution consists essentially of 16% KOH and 84% H$_2$O by weight.

3. The method of claim 1 wherein the etching solution further includes 0% to 1.5% isopropyl alcohol by weight.

4. An etching solution for silicon wafers consisting of KOH, isopropyl alcohol and H$_2$O, said etching solution composition being defined by the shaded area 150 of FIG. 3, excluding the y-axis.

5. The solution of claim 4 wherein said solution consists essentially of 16% KOH and 84% H$_2$O by weight.

6. The etching solution of claim 4 further including 0% to 1.5% isopropyl alcohol by weight.

* * * * *